US010240075B2

(12) United States Patent
Bradley et al.

(10) Patent No.: US 10,240,075 B2
(45) Date of Patent: Mar. 26, 2019

(54) BONDING DISSIMILAR MATERIALS WITH ADHESIVE PASTE

(71) Applicant: Zephyros, Inc., Romeo, MI (US)

(72) Inventors: Renee Bradley, St. Clair, MI (US); David Sheasley, Rochester, MI (US); Jeanne Bednarski, Ray Township, MI (US)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 14/787,080

(22) PCT Filed: Apr. 25, 2014

(86) PCT No.: PCT/US2014/035473
§ 371 (c)(1),
(2) Date: Oct. 26, 2015

(87) PCT Pub. No.: WO2014/176512
PCT Pub. Date: Oct. 30, 2014

(65) Prior Publication Data
US 2016/0108297 A1  Apr. 21, 2016

Related U.S. Application Data

(60) Provisional application No. 61/816,394, filed on Apr. 26, 2013.

(51) Int. Cl.
| *C08G 59/18* | (2006.01) |
| *C09J 5/08* | (2006.01) |
| *C09J 9/00* | (2006.01) |
| *C09J 11/08* | (2006.01) |
| *C09J 163/00* | (2006.01) |
| *C09J 171/00* | (2006.01) |
| *C08L 9/02* | (2006.01) |
| *C08L 51/04* | (2006.01) |
| *C08L 71/12* | (2006.01) |
| *C08L 81/04* | (2006.01) |

(52) U.S. Cl.
CPC ............. *C09J 171/00* (2013.01); *C09J 5/08* (2013.01); *C09J 9/00* (2013.01); *C09J 11/08* (2013.01); *C09J 163/00* (2013.01); C08G 59/186 (2013.01); C09J 2451/00 (2013.01); C09J 2463/00 (2013.01); C09J 2471/00 (2013.01); C09J 2475/00 (2013.01)

(58) Field of Classification Search
CPC .................................... C09J 95/08; C09J 5/08
See application file for complete search history.

(56) References Cited

U.S. PATENT DOCUMENTS

| 3,944,631 A | 3/1976 | Yu et al. |
| 3,984,497 A | 10/1976 | Owens et al. |
| 3,985,703 A | 10/1976 | Ferry et al. |
| 4,034,013 A | 7/1977 | Lane |
| 4,096,202 A | 6/1978 | Farnham et al. |
| 4,175,156 A | 11/1979 | Ikins |
| 4,304,709 A | 12/1981 | Salee |
| 4,306,040 A | 12/1981 | Baer |
| 4,495,324 A | 1/1985 | Chacko et al. |
| 4,536,436 A | 8/1985 | Maeoka et al. |
| 5,194,502 A | 3/1993 | Saito et al. |
| 5,212,261 A | 5/1993 | Stierman |
| 5,240,645 A | 8/1993 | Strecker |
| 5,275,853 A | 1/1994 | Silvis et al. |
| 5,290,857 A | 3/1994 | Ashida et al. |
| 5,464,924 A | 11/1995 | Silvis et al. |
| 5,962,093 A | 10/1999 | White et al. |
| 6,111,013 A | 8/2000 | Simpson et al. |
| 6,111,015 A | 8/2000 | Eldin et al. |
| 6,136,732 A | 10/2000 | Patel |
| 6,811,864 B2 | 11/2004 | Czaplicki et al. |
| 6,846,559 B2 | 1/2005 | Czaplicki et al. |
| 6,887,914 B2 | 5/2005 | Czaplicki et al. |
| 7,125,461 B2 | 10/2006 | Czaplicki et al. |
| 7,267,738 B2 | 9/2007 | Czaplicki et al. |
| 2003/0144416 A1 | 7/2003 | Tarbutton et al. |
| 2004/0076831 A1 | 4/2004 | Hable et al. |
| 2004/0221953 A1 | 11/2004 | Czaplicki et al. |
| 2004/0266899 A1 | 12/2004 | Muenz et al. |
| 2007/0090360 A1 | 4/2007 | Dai et al. |

(Continued)

FOREIGN PATENT DOCUMENTS

| JP | S56118816 A | 9/1981 |
| JP | H03247446 A | 11/1991 |

(Continued)

OTHER PUBLICATIONS

International Search Report and Written Opinion from the European Patent Office for Application No. PCT/US2014/035473, dated Oct. 24, 2014.
International Preliminary Report on Patentability from the European Patent Office for Application No. PCT/US2014/035473, dated Nov. 5, 2015.
Glass, Terry, "New Thermoplastic Adhesive and Barrier Resins" 2000, 1-5.

*Primary Examiner* — Melissa A Rioja
(74) *Attorney, Agent, or Firm* — The Dobrusin Law Firm, PC

(57) ABSTRACT

A rivetable adhesive for use in a joint between dissimilar materials, comprising a liquid epoxy resin, an expoxidized polysulfide, a flexibilizer, a solid epoxy CTBN adduct based upon bisphenol A, a phenoxy resin, an impact modifier including methacrylate-butadiene-styrene, a curing agent; and a blowing agent. The adhesive finds particular suitability for use in riveting aluminum panels to steel structures, such as for forming automotive vehicle roof structures.

19 Claims, 1 Drawing Sheet

(56) References Cited

U.S. PATENT DOCUMENTS

| | | | |
|---|---|---|---|
| 2008/0029200 A1* | 2/2008 | Sheasley | B60R 13/06 |
| | | | 156/79 |
| 2008/0060742 A1 | 3/2008 | Sheasley et al. | |
| 2008/0105992 A1 | 5/2008 | Walker et al. | |
| 2008/0299317 A1 | 12/2008 | Hable | |
| 2008/0308212 A1* | 12/2008 | Sheasley | C08G 59/502 |
| | | | 156/78 |
| 2014/0024730 A1* | 1/2014 | Shimakawa | C08J 9/06 |
| | | | 521/50.5 |

FOREIGN PATENT DOCUMENTS

| | | | |
|---|---|---|---|
| WO | 2004/078853 A2 | 9/2004 | |
| WO | 2009/124709 A1 | 10/2009 | |
| WO | 2012/110230 A1 | 8/2012 | |

\* cited by examiner

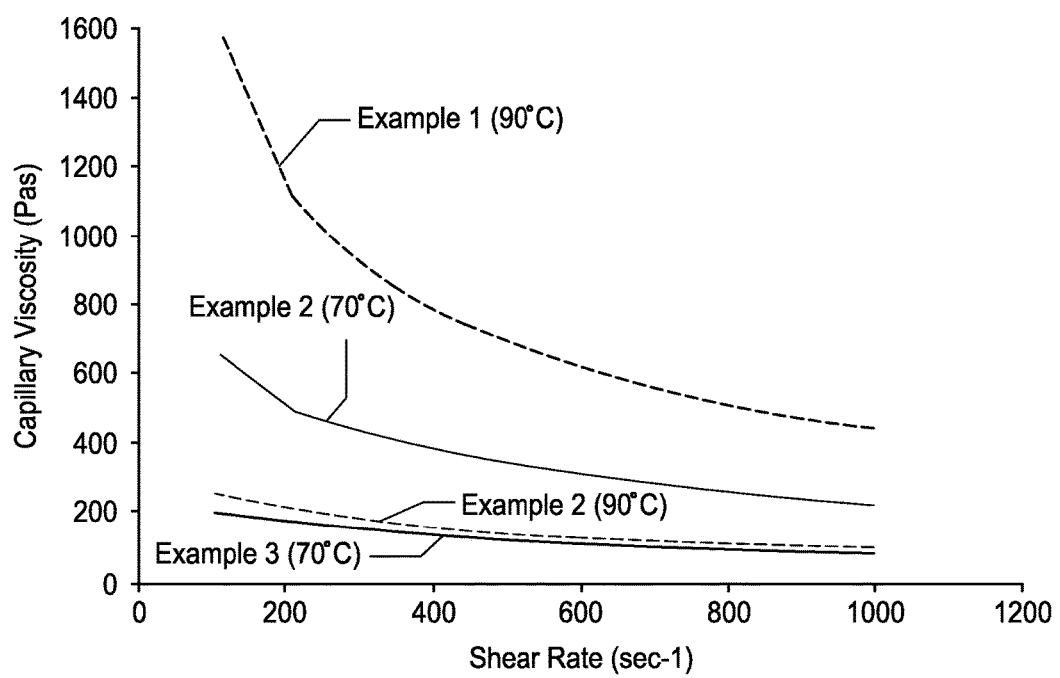

BONDING DISSIMILAR MATERIALS WITH ADHESIVE PASTE

TECHNICAL FIELD

The present invention pertains generally to adhesives and more particularly to paste adhesives for bonding dissimilar materials (e.g., steel and aluminum) in automotive vehicle structures.

BACKGROUND

In the automotive vehicle field there is an ongoing need for reducing weight of vehicle components. Traditionally, many vehicle body components have been made from steel. Joining such parts typically has been done by welding. In recent years, vehicle manufacturers have sought to substitute other materials for steel. For example, due to its relatively high strength to weight ratio, aluminum has been examined as a substitute material. When steel and aluminum are employed in combination, unfortunately, welding is an impractical solution. There is thus a need for forming a relatively high integrity joint between steel and aluminum for such applications.

One particular application that involves forming joints between steel and aluminum is the formation of vehicle roof structures. For these structures, efforts have been made to join an aluminum roof panel structure to a steel frame structure using rivets. When aluminum is attached to steel using rivets as mechanical fasteners, and the assembly is subjected to thermal cycling (such as under paint bake conditions), there results a potential for distortion of the assembly due to differing coefficients of thermal expansion. For instance, the aluminum experiences a bowing effect that increases any gap that may exist between aluminum and steel components.

Efforts have been made to employ pumpable adhesives between steel and aluminum. By their nature, pumpable adhesives tend to have a relatively low viscosity. As a result, when employed between steel and aluminum, there is a propensity for the steel and aluminum to come into contact with each other during riveting. This creates the potential for galvanic corrosion at the points of contact. Such adhesives also have made it necessary is some instances to employ secondary applications of sealant for assuring moisture protection at the joints.

What is needed is an adhesive and system for applying it that has characteristics sufficient for allowing riveting while still maintaining a separation between the steel and aluminum components during riveting.

SUMMARY OF THE INVENTION

The teachings herein meet the above need by providing an improved adhesive and a method for robotically applying the adhesive. Though the teachings find application in riveting aluminum roof panels to steel frames, other applications are possible as well. As can be appreciated, the teachings herein provide a way to avoid galvanic corrosion between aluminum and steel when those materials are riveted in an assembly. The teachings herein also provide for assuring that a bond is maintained between aluminum and steel structures during thermal cycling (e.g., as part of a paint bake operation), which would otherwise cause the aluminum and steel to separate from each other. As a result, it is possible to achieve good water sealing performance in the resulting assemblies during paint bake operations, and the need for subsequent sealing operations can be avoided.

The advantages herein are made possible by the use of a paste adhesive that is thermally activatable to expand and fill any gaps between aluminum and steel components during a paint bake operation.

In one aspect, the teachings envision a rivetable adhesive for use in a joint between dissimilar materials, comprising a liquid epoxy resin, an expoxidized polysulfide, a flexibilizer, a solid epoxy CTBN adduct based upon bisphenol A, a phenoxy resin, an impact modifier including methacrylate-butadiene-styrene, a curing agent; and a blowing agent.

In a more specific example, the teachings herein contemplate a rivetable adhesive for use in a joint between dissimilar materials, comprising an admixture of about 15 to about 25 parts by weight of a liquid epoxy resin reaction product of epichlorohydrin and bisphenol A having an epoxide equivalent weight per ASTM D-1652-11e1 of about 182 to about 192; about 10 to about 20 parts by weight of an epoxidized polysulfide; about 3 to about 20 parts by weight of a liquid epoxy resin reaction product of an epichlorohydrin and a polypropylene glycol; about 1 to about 5 parts by weight of a flexibilizer; about 3 to about 15 parts by weight of a solid epoxy carboxyl terminated butadiene-acrylonitrile (CTBN) adduct based upon bisphenol A: about 15 to about 25 parts by weight of an impact modifier of methacrylate-butadiene-styrene; about 15 to about 30 parts by weight of phenoxy resin; about 1 to about 5 parts by weight of a dicyandiamide curing agent; an aromatic substituted urea curing agent accelerator in an amount of about 0.3 to about 1 parts by weight; and a blowing agent having a decomposition temperature of about 190 to about 220° C.

The adhesives herein may be robotically applied to a substrate. For example, the adhesives may be applied to a steel structure, an aluminum structure or both (or between some other combination of dissimilar materials), and the structures may be bonded together with the adhesive (e.g., after subjecting the adhesive to heat from a paint bake operation as described herein). A rivet may join the dissimilar materials.

DESCRIPTION OF THE DRAWINGS

FIG. 1 illustrates performance data in accordance with the present teachings.

DETAILED DESCRIPTION

This application claims the benefit of the filing date of U.S. Provisional Application Ser. No. 61/816,394 filed Apr. 26, 2013, the contents of such application being hereby incorporated by reference for all purposes.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The teachings herein make advantageous use of an improved composition for bonding dissimilar materials, and particularly for bonding steel and aluminum. The teachings herein also make advantageous use of an improved method for bonding dissimilar materials, where the method employs robotic application of a paste adhesive between components (e.g., components made of dissimilar materials, such as steel and aluminum) to be joined. Use of a rivet for joining is also contemplated.

The adhesive material may be a polymeric material that is activated to flow, seal, expand or any combination thereof. It may be a material that forms a foam (e.g., an acoustic foam or a structural foam). It may expand from its original volume to at least 50%, or even at least about 100% (e.g., in the range of about 80 to about 100%) or larger of its original volume.

The adhesive material may be applied through a die associated with a robot arm. It may be applied at about room temperature. The adhesive may be heated to be applied above room temperature, but below a temperature at which it would be activated for curing, expanding or both.

The adhesive material may be activated when subjected to heat during paint shop baking operations. In applications where the adhesive material is a heat activated, thermally expanding material, an important consideration involved with the selection and formulation of the material comprising the adhesive material is the temperature at which a material reaction or expansion, and possibly curing, will take place. For instance, in most applications, it is undesirable for the material to be reactive at room temperature or otherwise at the ambient temperature in a production line environment. More typically, the adhesive material becomes reactive at higher processing temperatures, such as those encountered in an automobile assembly plant, when the material is processed along with the automobile components at elevated temperatures or at higher applied energy levels, e.g., during paint or e-coat curing or baking steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. Following activation of the adhesive material, the material will typically cure. Thus, it may be possible that the adhesive material may be heated, it may then expand, and may thereafter cure to form a resulting foamed material.

EXAMPLES

Among the following examples are examples that illustrate materials that may are rivetable and exhibit attractive characteristics for the present application. The amounts shown are in preferred parts by weight. The teachings herein contemplate such amounts as well as amounts that are +/−10%, 20%, 30%, 40% or even 50% of those shown. Examples 2 and 3 exhibit particularly attractive viscosity characteristics and exhibit good riveting characteristics. Example 1 is included by way of comparison. The compositions need not necessarily employ the specific commercial examples as set forth in the following Table 1. The compositions may employ the general components as described in the following Table 1. The composition may employ ingredients that exhibit the characteristics set forth in the following Table 1. Even if not explicitly specified, relative proportions of ingredients are within the scope of the teachings herein.

TABLE 1

| Component | Characteristic | Commercial Example | Example 1 (in parts by weight) | Example 2 (in parts by weight) | Example 3 (in parts by weight) |
|---|---|---|---|---|---|
| Liquid epoxy resin reaction product of epichlorohydrin and bisphenol A | Epoxide equivalent weight (g/eq) per ASTM D-1652 of about 182-192 | DER 331 from The Dow Chemical Company | — | 16.48 | 20.60 |
| Expoxidized Polysulfide including epoxy terminated polymer with diglycidyl ether of bisphenol A and chains with polysulfide | Epoxide equivalent weight (g/eq) per ASTM D-1652-11e1 of about 320 | Thioplast EPS-350 from Akzo Nobel | 8.00 | 17.01 | 15.36 |
| Liquid epoxy resin reaction product of epichlorohydrin and polypropylene glycol | Epoxide equivalent weight (g/eq) per ASTM D-1652-11e1 of about 310-330 | DER 732 from The Dow Chemical Company | 6.70 | 6.70 | 12.92 |
| Flexibilizer | Polyurethane polyol | DY 965 from Huntsman | 2.50 | 2.50 | 2.25 |
| Solid epoxy resin reaction product of epichlorohydrin and bisphenol A | Epoxide equivalent weight (g/eq) per ASTM D-1652-11e1 of about 590-630 | DER 662 from The Dow Chemical Company | 11.00 | — | — |

TABLE 1-continued

| Component | Characteristic | Commercial Example | Example 1 (in parts by weight) | Example 2 (in parts by weight) | Example 3 (in parts by weight) |
|---|---|---|---|---|---|
| Solid epoxy carboxyl terminated butadiene-acrylontirile (CTBN) adduct based upon bisphenol A | Epoxide equivalent weight (g/eq) per ASTM D-1652-11e1 of about 1560-1820 | Araldite 1522 ES | 16.00 | 5.00 | 4.52 |
| Impact modifier of methacrylate-butadiene-styrene (core-shell) | | Paraloid 2691A from the Dow Chemical company | 20.98 | 20.98 | 18.73 |
| Phenoxy Resin | | TMEP-70 from Springfield Indus. | 24.77 | 24.77 | 19.35 |
| Dicyandiamide curing agent | | Dycanex 1400B from Air Products | 2.85 | 3.40 | 3.40 |
| Aromatic substituted urea curing accelerator (e.g., [4,4'-Methylene bis (Phenyl Dimethyl Urea]) | Melting point of 220-230° C. | Omicure U-52M from Emerald | 0.76 | 0.76 | 0.69 |
| Calcined kaolin | pH of about 6 and average particle size of about 1.3 μm | Satintone W from BASF | 5.49 | 1.47 | 1.25 |
| Blowing agent of Activated azodicarbonamide | Decomposition temperature of about 165 to 180° C. | Celogen 754A from Lion Copolymer | 0.90 | — | — |
| Blowing agent of azodicarbonamide | Decomposition temperature of about 190 to 220° C. | Celogen AZ-120 from Lion Copolymer | — | 0.90 | 0.90 |
| Colorant | | Pigment | 0.05 | 0.03 | 0.03 |

FIG. 1 illustrates capillary viscosity data obtainable using the compositions of the teachings herein. As seen, the Example 1 formulation has a much higher viscosity than the viscosity of the Example 2 and 3 formulations. Two different test temperatures are used to cover the range of viscosities among the three materials. The reference test method for capillary viscosity employed is ASTM D 3835-08, pursuant to which the test parameters for the capillaries are as follows: diameter=1 mm, length=16 mm.

As seen from FIG. 1, Examples 2 and 3 exhibit a capillary viscosity well below 1000 PaS at temperatures of 70 or 90° C. and a shear rate (sec−1) of 200 or higher. For use herein, it is desirable for materials to exhibit a capillary viscosity in the range of about 100 to about 700 PaS for a shear rate (sec−1) of about 100 to about 1000 at a temperature of 70 or 90° C. For example, it is desirable for materials to exhibit a capillary viscosity in the range of about 100 to about 700 PaS for a shear rate (sec−1) of about 100 to about 1000 at a temperature of 70 or 90° C. Materials may exhibit a capillary viscosity in the range of about 100 to about 400 PaS for a shear rate (sec−1) of about 400 to about 1000 at a temperature of 70 or 90° C. For certain applications it is desirable that the materials (at 70 or 90° C.) will have a capillary viscosity at shear rate (sec−1) in the range of about 200 to about 400 PaS that is less than 700 PaS, or even less than 500 PaS. The materials (at 70 or 90° C.) will typically exhibit a capillary viscosity of at least about 100 PaS at a shear rate (sec−1) of about 200 to about 1000.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of "x parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for ail purposes. The term "consisting essentially of to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. A rivetable adhesive for use in a joint between dissimilar materials, comprising:
    a. a first liquid epoxy resin in an amount of about 15 to about 25 parts by weight per 100 parts by weight of the rivetable adhesive and a second liquid epoxy resin in amount of about 3 to about 20 parts by weight per 100 parts by weight of the rivetable adhesive;
    b. an expoxidized polysulfide;
    c. a flexibilizer;
    d. a solid epoxy CTBN adduct based upon bisphenol A in an amount not greater than about 15 parts by weight per 100 parts by weight of the rivetable adhesive;
    e. a phenoxy resin;
    f. an impact modifier including methacrylate-butadiene-styrene;
    g. a curing agent; and
    h. a blowing agent having a decomposition temperature of about 190 to about 220° C.; and
    wherein the adhesive exhibits a capillary viscosity of below 800 PaS for a shear rate of 100 sec−1 or higher at a temperature of 70 or 90° C.;
    wherein a ratio of the amount by weight of the first liquid epoxy resin to the amount by weight of the second liquid epoxy resin is from about 1.6:1 to about 2.4:1; and
    wherein the decomposition temperature of the blowing agent facilitates robotic application such that the adhesive is heated to be applied above room temperature, but below a temperature at which it would be activated for curing, expanding or both curing and expanding.

2. The adhesive of claim 1, wherein the first liquid epoxy resin has an epoxide equivalent weight (g/eq) per ASTM D-1652-11e1 of about 182-192.

3. The adhesive of claim 1, wherein the impact modifier is a core shell impact modifier.

4. The adhesive of claim 1, further including an aromatic substituted urea curing accelerator.

5. The adhesive of claim 3, wherein the first liquid epoxy resin is a resin reaction product of epichlorohydrin and bisphenol A having an epoxide equivalent weight per ASTM D-1652-11e1 of about 182 to about 192.

6. The adhesive of claim 1, wherein the second liquid epoxy resin has an epoxide equivalent weight (g/eq) per ASTM D-1652-11e1 of about 320.

7. The adhesive of claim 6, wherein the second liquid epoxy resin is a reaction product of an epichlorohydrin and a polypropylene glycol.

8. The adhesive of claim 1, wherein the flexibilizer is present in an amount of about 1 to about 5 parts by weight of the adhesive.

9. The adhesive of claim 1, wherein the impact modifier is present in an amount of about 15 to about 25 parts by weight of the adhesive.

10. The adhesive of claim 9, wherein the solid epoxy CTBN adduct based upon bisphenol A is present in an amount of about 3 to about 15 parts by weight of the adhesive.

11. The adhesive of claim 1, wherein the phenoxy resin is present in an amount of about 15 to about 30 parts by weight of the adhesive.

12. A rivetable adhesive for use in a joint between dissimilar materials, comprising an admixture of:
    a. a first liquid epoxy resin including a liquid epoxy resin reaction product of epichlorohydrin and bisphenol A and having an epoxide equivalent weight per ASTM D-1652-11e1 of about 182 to about 192;
    b. about 10 to about 20 parts by weight of an epoxidized polysulfide;
    c. a second liquid epoxy resin including a liquid epoxy resin reaction product of an epichlorohydrin and a polypropylene glycol;
    d. about 1 to about 5 parts by weight of a flexibilizer;
    e. about 3 to about 15 parts by weight of a solid epoxy carboxyl terminated butadiene-acrylontirile (CTBN) adduct based upon bisphenol A;
    f. a blowing agent having a decomposition temperature of about 190 to about 220° C.; and
    wherein the ratio of the amount by weight of the first liquid epoxy resin to the amount by weight of the second liquid epoxy resin in the adhesive is from about 1.6:1 to about 2.4:1;
    wherein the adhesive exhibits a capillary viscosity of below 800 PaS for a shear rate of 100 sec−1 or higher at a temperature of 70 or 90° C.; and
    wherein the decomposition temperature of the blowing agent facilitates robotic application such that the adhesive is heated to be applied above room temperature, but below a temperature at which it would be activated for curing, expanding or both curing and expanding.

13. The adhesive of claim 1, wherein the adhesive further includes about 0.5 to about 3 parts by weight of calcined kaolin.

14. A rivetable adhesive according to claim 1, wherein the adhesive exhibits a capillary viscosity in the range of about 100 to about 700 PaS for a shear rate of about 100 to about 1000 sec−1 at a temperature of 70 or 90° C.

15. A rivetable adhesive according to claim 11, wherein the adhesive exhibits a capillary viscosity in the range of about 100 to about 400 PaS for a shear rate of about 400 to about 1000 sec−1 at a temperature of 70 or 90° C.

16. A rivetable adhesive according to claim 12, wherein the adhesive exhibits a capillary viscosity in the range of about 100 to about 700 PaS for a shear rate of about 100 to about 1000 sec−1 at a temperature of 70 or 90° C.

17. A rivetable adhesive according to claim 12, wherein the adhesive exhibits a capillary viscosity in the range of about 100 to about 400 PaS for a shear rate of about 400 to about 1000 sec−1 at a temperature of 70 or 90° C.

18. The adhesive of claim 1, wherein the viscosity of the adhesive is adapted to allow for robotic application of the adhesive via a robotic arm and applicator.

19. The adhesive of claim 1, wherein an amount of the solid epoxy CTBN adduct based upon bisphenol A relative to an amount of the impact modifier including methacrylate-butadiene-styrene is about 5 parts by weight of the solid epoxy CTBN adduct based upon bisphenol A to about 20 parts by weight of the impact modifier including methacrylate-butadiene-styrene.

* * * * *